(12) United States Patent
Xia et al.

(10) Patent No.: US 11,044,457 B2
(45) Date of Patent: Jun. 22, 2021

(54) METHOD FOR PROCESSING DATA, SERVER AND COMPUTER STORAGE MEDIUM

(71) Applicant: GUANGDONG OPPO MOBILE TELECOMMUNICATIONS CORP., LTD., Guangdong (CN)

(72) Inventors: Yang Xia, Dongguan (CN); Zhengpeng Tan, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/585,120

(22) Filed: Sep. 27, 2019

(65) Prior Publication Data

US 2020/0107010 A1 Apr. 2, 2020

(30) Foreign Application Priority Data

Sep. 30, 2018 (CN) .......................... 201811161566.7

(51) Int. Cl.
*H04N 13/194* (2018.01)
*H04N 13/106* (2018.01)

(52) U.S. Cl.
CPC ......... *H04N 13/194* (2018.05); *H04N 13/106* (2018.05)

(58) Field of Classification Search
CPC ........................... H04N 13/194; H04N 13/106
See application file for complete search history.

(56) References Cited

U.S. PATENT DOCUMENTS

| 9,721,383 B1 | 8/2017 | Horowitz et al. |
| 2013/0170541 A1 | 7/2013 | Pace et al. |
| 2014/0201029 A9 | 7/2014 | Plattsmier |
| 2015/0009214 A1* | 1/2015 | Lee .......................... G06T 17/20 345/420 |
| 2016/0101356 A1 | 4/2016 | Kuo et al. |

FOREIGN PATENT DOCUMENTS

| CN | 101271469 A | 9/2008 |
| CN | 103731583 A | 4/2014 |
| CN | 104679831 A | 6/2015 |
| CN | 105243139 A | 1/2016 |

(Continued)

OTHER PUBLICATIONS

Sotiris Malassiotis et al: "Object-Based Coding of Stereo Image Sequences Using Three-Dimensional Models", IEEE Transactions on Circuits and Systems for Video Technology, Institute of Electrical and Electronics Engineers, US, vol. 7, No. 6, Dec. 1, 1997 (Dec. 1, 1997). XP011014432, ISSN: 1051-8215 * Title * * Abstract *.

(Continued)

*Primary Examiner* — Girumsew Wendmagegn

(57) ABSTRACT

A method for processing data, a server and a computer storage medium are provided. The method includes: three-Dimensional (3D) video data is received from a terminal, and an initial model is established based on the 3D video data; the initial model is matched with models in a preset model set, here, the preset model set includes overall models of multiple target objects; and indication information is sent to the terminal based on a matching result.

14 Claims, 4 Drawing Sheets

(56) References Cited

FOREIGN PATENT DOCUMENTS

| CN | 105511602 A | | 4/2016 |
|---|---|---|---|
| CN | 105760809 A | | 7/2016 |
| CN | 106169067 A | | 11/2016 |
| CN | 107222468 A | * | 9/2017 |
| CN | 107222468 A | | 9/2017 |
| CN | 107578467 A | | 1/2018 |
| CN | 108023942 A | | 5/2018 |
| CN | 108182728 A | | 6/2018 |
| CN | 108399367 A | | 8/2018 |
| CN | 108446680 A | | 8/2018 |
| CN | 108600728 A | | 9/2018 |
| CN | 109410319 A | | 3/2019 |
| EP | 2446291 A1 | | 5/2012 |

OTHER PUBLICATIONS

International Search Report in the international application No. PCT/CN2019/109152, dated Dec. 30, 2019.
Written Opinion of the International Search Authority in the international application No. PCT/CN2019/109152, dated Dec. 30, 2019.
Supplementary European Search Report in the European application No. 19200524.7, dated Dec. 18, 2019.
First Office Action of the Chinese application No. 201811161566.7, dated May 6, 2020.
Second Office Action of the Chinese application No. 201811161566.7, dated Aug. 14, 2020.
Cai Ruxue; "Research on Mobile Augmented Reality Based on MEC", Information Technology Series of Full-text Database of Chinese Excellent Master's Thesis, vol. 2018 No. 03, Mar. 15, 2018.
Zhou Yiqing et al., "Mobile AR/VR in 5G based on convergence of communication and computing", Telecommunications Science, Aug. 30, 2018, p. 19-33.
Notice of Allowance of the Chinese application No. 201811161566.7, dated Nov. 5, 2020.
Office Action of the Indian application No. 201914039324, dated Jan. 18, 2021.

* cited by examiner

201: 3D video data is received from a terminal, and an initial model is established based on the 3D video data 202: The initial model is matched with models in a preset model set, here, the preset model set includes overall models of multiple target objects 203: Indication information is sent to the terminal based on a matching result

METHOD FOR PROCESSING DATA, SERVER AND COMPUTER STORAGE MEDIUM

CROSS-REFERENCE TO RELATED APPLICATIONS

The application claims priority and rights to Chinese Patent Application No. 201811161566.7, filed on Sep. 30, 2018, the contents of which are hereby incorporated by reference in its entirety.

BACKGROUND

With the continuous development of a mobile communication network, a transmission rate of the mobile communication network is increasing rapidly, which provides a powerful technical support for the emergence and development of a Three-Dimensional (3D) video service. 3D video data include Two-Dimensional (2D) image data (such as RGB data) and depth data, and the 2D video data and the depth data are separately transmitted in a transmission process of the 3D video data. However, because a large volume of the 3D video data is acquired, the volume of data to be transmitted is also very large and a high technical support is needed in a data transmission process. Thus, the mobile communication network needs to have a rapid data transmission rate and a stable data transmission environment. Moreover, because of the large volume of data, the time consumed for modeling of a Mobile Edge Computing (MEC) server is very long.

SUMMARY

In order to solve the above technical problems, the embodiments of the disclosure provide a method for processing data, a server and a computer storage medium.

In a first aspect, the embodiments of the disclosure provide a method for processing data. The method is applied to an MEC server and includes the following operations.

Three-Dimensional (3D) video data is received from a terminal, and an initial model is established based on the 3D video data.

The initial model is matched with models in a preset model set, here, the preset model set includes overall models of multiple target objects.

Indication information is sent to the terminal based on a matching result.

In a second aspect, the embodiments of the disclosure provide an MEC server. The MEC server comprises a processor and a transceiver.

The transceiver is configured to receive three-Dimensional (3D) video data from a terminal.

The processor is configured to establish an initial model based on the 3D video data; match the initial model with models in a preset model set, here, the preset model set includes overall models of multiple target objects.

The transceiver is configured to send indication information to the terminal based on a matching result.

In a third aspect, the embodiments of the disclosure provide an MEC server. The MEC server includes a communication unit, a modeling unit and a matching unit.

The communication unit is configured to receive 3D video data from a terminal.

The modeling unit is configured to establish an initial model based on the 3D video data received by the communication unit.

The matching unit is configured to match the initial model with models in a preset model set, here, the preset model set includes overall models of multiple target objects.

The communication unit is further configured to send indication information to the terminal based on a matching result obtained by the matching unit.

In a fourth aspect, the embodiments of the disclosure further provide a computer storage medium. The computer storage medium has stored thereon a computer instruction that, when executed by a processor, causes the processor to perform a method for processing data. The method comprises: three-Dimensional (3D) video data is received from a terminal, and an initial model is established based on the 3D video data; the initial model is matched with models in a preset model set, here, the preset model set includes overall models of multiple target objects; and indication information is sent to the terminal based on the matching result.

DETAILED DESCRIPTION

Before the technical solutions in the embodiments of the disclosure are described in detail, the architecture of a system to which a method for processing data in an embodiment of the disclosure is applied will be described briefly. The method for processing data in the embodiment of the disclosure is applied to a relevant service of 3D video data. The service may be, for example, a service for sharing the 3D video data, or a live service based on the 3D video data, etc. Under such a condition, because of a large volume of the 3D video data, a high technical support is required for depth data and 2D video data that are transmitted respectively in a data transmission process, and thus the mobile communication network needs to have a rapid data transmission rate and a stable data transmission environment.

Figures 1, 2:
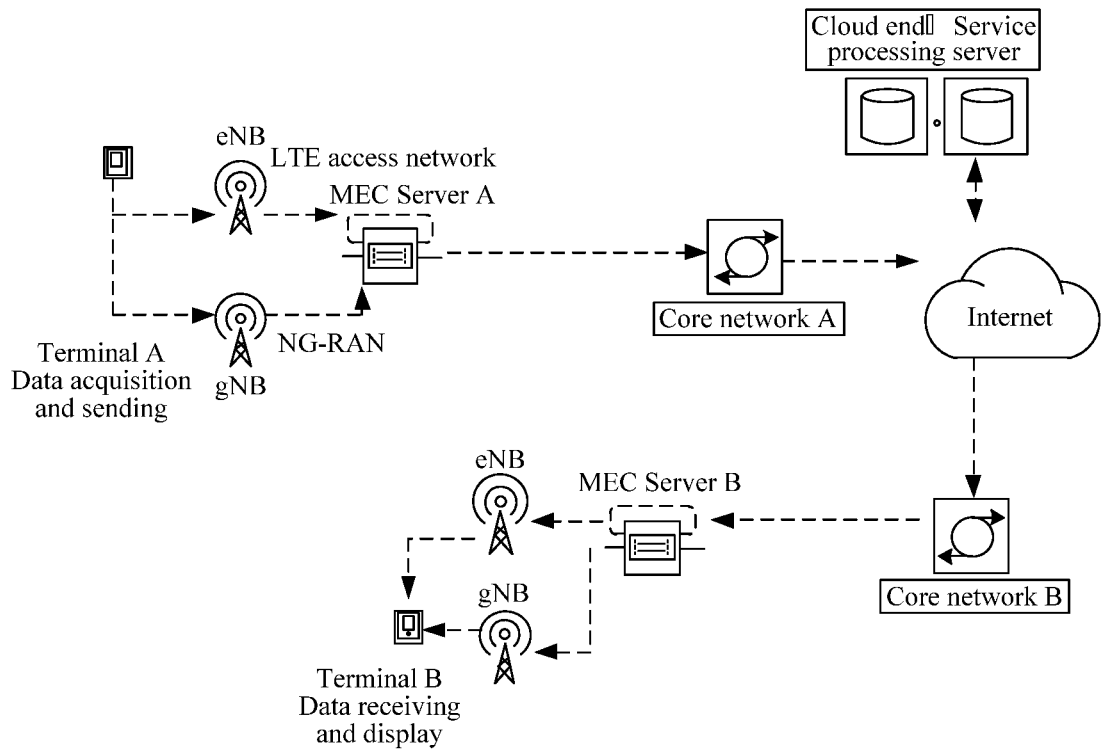
FIG. 1 is an architectural diagram of a system to which a method for processing data is applied according to an embodiment of the disclosure.
FIG. 2 is a first flowchart of a method for processing data according to an embodiment of the disclosure.

FIG. 1 is an architectural diagram of a system to which a method for processing data is applied according to an embodiment of the disclosure. As illustrated in FIG. 1, the system may include a terminal, a base station, an MEC server, a service processing server, a core network and an Internet, etc. A high-speed channel is established between the MEC server and the service processing server via the core network to implement data synchronization.

For example, in an application scenario where two terminals interacts with each other in FIG. 1, the MEC server A is an MEC server deployed close to the terminal A (sending end), and the core network A is a core network in an area where the terminal A is located. Correspondingly, the MEC server B is an MEC server deployed close to the terminal B (receiving end), and the core network B is a core network in an area where the terminal B is located. A high-speed channel may be established between the MEC server A and the service processing server via the core network A to implement data synchronization, and a high-speed channel may be established between the MEC server B and the service processing server via the core network B to implement data synchronization.

After the 3D video data sent by the terminal A are transmitted to the MEC server A, the MEC server A synchronizes the data to the service processing server via the core network A; and the MEC server B acquires, from the service processing server, the 3D video data sent by the terminal A, and sends the 3D video data to the terminal B to display.

Herein, if the terminal B and the terminal A implement the transmission via a same MEC server, the terminal B and the terminal A implement the transmission of the 3D video data directly via one MEC server, and the participation of the service processing server is not needed, and such a manner is called as a local backhaul manner. Specifically, it is assumed that the terminal B and the terminal A implement the transmission of the 3D video data via the MEC server A, after the 3D video data sent by the terminal A are transmitted to the MEC server A, the MEC server A sends the 3D video data to the terminal B to display.

Herein, the terminal may selectively access, based on a network condition, or an configuration condition of the terminal, or an algorithm configured by the terminal, an Evolved Node B (eNB) of a 4G network or access a gNB of a 5G network, so that the eNB is connected with the MEC server via a Long Term Evolution (LTE) access network, and the gNB is connected with the MEC server via a Next Generation Radio Access Network (NG-RAN).

Herein, the MEC server is deployed on a network edge close to the terminal or a data source, and the so-called being close to the terminal or close to the data source includes being close to the terminal or close to the data source not only in logical positions but also at geographical positions. Different from the case in the related mobile communication network that main service processing servers are deployed in several big cities, multiple MEC servers may be deployed in one city. For example, when there are many users in an office building, it may be appropriate to deploy one MEC server nearby the office building.

As an edge computing gateway having core capabilities of converging network, computing, storing and application, the MEC server provides a platform support including a device domain, a network domain, a data domain and an application domain for the edge computing. The MEC server is connected to various types of intelligent devices and sensors, and provides intelligent connection and data processing services in site, so that different types of applications and data are processed in the MEC server, thus implementing key intelligent services such as service real-time, service intelligence, data aggregation and interactive operation, security and privacy protection, and effectively improving the intelligent decision efficiency of each service.

The embodiments of the disclosure further provide a method for processing data, which is applied to a server. The server is the MEC server illustrated in FIG. 1. FIG. 2 is a first flowchart of a method for processing data according to an embodiment of the disclosure. As illustrated in FIG. 2, the method includes the following operations.

At Block 201: 3D video data is received from a terminal, and an initial model is established based on the 3D video data.

At Block 202: the initial model is matched with models in a preset model set, here, the preset model set includes overall models of multiple target objects.

At Block 203: indication information is sent to the terminal based on a matching result.

In the embodiment, the 3D video data is acquired by the terminal from an acquisition component that is at least able to acquire depth data. The acquisition component may establish a communication link with at least one terminal so that the corresponding terminal acquires the 3D video data.

Specifically, in an implementation manner, since the acquisition component capable of acquiring the depth data is relatively expensive, the terminal does not have the function of acquiring the 3D video data. The 3D video data is acquired by the acquisition component independent of the terminal; and the acquisition component establishes a communication link with a communication component in the terminal, so that the terminal obtains the 3D video data acquired by the acquisition component. The acquisition component may be specifically implemented via at least one of the followings: a depth camera, a dual camera, a 3D structural light camera module, and a Time Of Flight (TOF) camera module.

Herein, the acquisition component can establish the communication link with at least one terminal to transmit the acquired 3D video data to the at least one terminal, so that the corresponding terminal obtains the 3D video data. In this way, the 3D video data acquired by an acquisition component can be shared to the at least one terminal to implement the sharing of the acquisition component.

In another implementation manner, the terminal itself has the function of acquiring the 3D video data. The terminal is provided with an acquisition component at least capable of acquiring the depth data, and for example, is provided with at least one of the following components to acquire the 3D video data: a depth camera, a dual camera, a 3D structural light camera module, and a TOF camera module.

The acquired 3D video data include 2D video data and depth data, the 2D video data is used for characterizing a plane image, for example, may be RGB data; and the depth data is used for characterizing a distance between a surface of an object acquired by the acquisition component and the acquisition component.

The embodiment is applied to an application scenario in which the quality of a communication channel between the terminal and the MEC server is good, i.e., a scenario in which the transmission rate and transmission stability of the communication channel meet a preset condition, e.g., the transmission rate of the communication channel is higher than a first preset threshold and the packet loss rate in data transmission is lower than a second preset threshold. In such a high-speed low-delay scenario, the transmission of the terminal corresponds to the 3D video data, and the terminal does not store the 3D video data locally but directly sends out the 3D video data.

In the embodiment, the so-called terminal does not store the 3D video data locally but directly sends out the 3D video data means that the data that has been sent out are not stored by the terminal locally, and the data that has not been sent out still need to be stored by the terminal locally.

In the embodiment, as an implementation manner, the received 3D video data include the 2D video data and the depth data. As another implementation manner, the received 3D video data may also only include the depth data. A server performs modeling based on the depth data in the received 3D video data to obtain an initial model.

In the embodiment, the server presets a model set, and the model set includes overall models of multiple target objects. Each of the target objects may be a real person, a virtual person, a real animal, a virtual animal and the like, and the type of each of the target objects is not defined by the embodiment thereto. In actual application, the model set may include multiple sub-model sets, and each sub-model set may be directed at one type of target objects. For example, a corresponding sub-module set is preset for the real persons; and a corresponding sub-module set may be preset for some type of real animals, such as dogs, etc.

Figure 3:
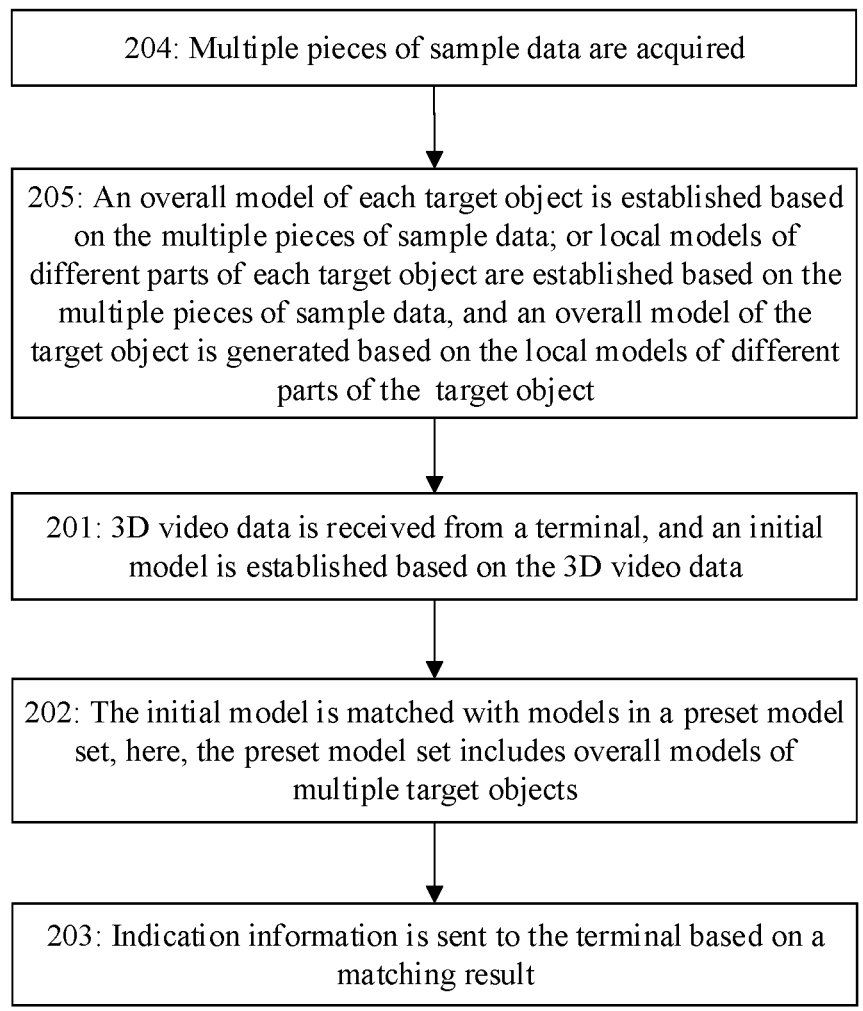
FIG. 3 is a second flowchart of a method for processing data according to an embodiment of the disclosure.

In an embodiment, as illustrated in FIG. 3, the method further includes the following operations.

At Block 204: multiple pieces of sample data are acquired, here, the multiple pieces of sample data include at least one of global data corresponding to each target object or local data corresponding to different parts of each target object.

At Block 205: an overall model of the target object is established based on the multiple pieces of sample data; or local models of different parts of the target object are established based on the multiple pieces of sample data, and an overall model of the target object is generated based on the local models of different parts of the target object.

In the embodiment, the server establishes the overall models according to the multiple pieces of sample data acquired. As a first implementation manner, the acquired sample data includes global data corresponding to each target object. For example, the target object is a real person, the sample data is global data of the real person. As another implementation manner, the acquired sample data includes local data corresponding to different parts of each target object. For example, the target object is a real person, and the real person may include a head area, a trunk area (the trunk area may further be specifically divided into a shoulder area, a chest area and a waist area, etc.) and a limb area (the limb area may further be specifically divided into an arm area, a hand area, a leg area and a foot area, etc.), etc., the sample data may be directed at local areas of the above different parts of the real person.

In the embodiment, the multiple pieces of sample data correspond to different target objects, or even correspond to different parts of different target objects. The overall models are established for the different target objects.

As an implementation manner, when the sample data includes global data corresponding to each target object, an overall model of the target object is established based on the global data.

As another implementation manner, when the sample data includes the local data corresponding to different parts of each target object, local models of the target object are established based on the local data. Further, local models of the different parts of the different target objects may be arranged and combined, for example, a local model a1 and a local model a2 of a target object A are acquired; and a local model b1 and a local model b2 of a target object B are acquired. On one hand, an overall model of the target object A may be established based on the local model a1 and the local model a2, and an overall model of the target object B may be established based on the local model b1 and the local model b2. On the other hand, an overall model may be established based on the local model a1 and the local model b2, and another overall model may be established based on the local model b1 and the local model a2. In the embodiment, the large number of overall models of target objects may be obtained based on the local models, thus contributing to the model matching.

In the embodiment, the sample data may only include the depth data, or may also include the depth data and the 2D video data. Any data capable of establishing a 3D model are within scope of the protection of the embodiment of the disclosure.

It may be understood that the operations 204 and 205 are executed before the operation 202, i.e., before the initial model is matched with models in the preset model set, the overall models in the model set are established.

In the embodiment, the server matches the initial model with the models in the preset model set.

As an implementation manner, the server matches the initial model with overall models in the preset model set. The embodiment is applied to a scenario in which the received 3D video data is global data corresponding to a target object. As an example, if the terminal transmits the acquired 3D video data corresponding to the entire target object to the server completely, the 3D video data received by the server is 3D video data corresponding to the entire target object, and the initial model established by the server based on the 3D video data is the initial model corresponding to the entire target object.

As another implementation manner, the server matches the initial model with local models, formed into an overall model, in the preset model set. The embodiment is applied to a scenario in which the received 3D video data is local data corresponding to parts of a target object. As an example, if the terminal transmits the acquired 3D video data corresponding to each part of the target object to the server respectively, the server needs to perform respective modeling on the received 3D video data corresponding to each part, i.e., the acquired initial model herein is an initial model corresponding to each part of the target object.

In the embodiment, the operation of the initial model is matched with the models in the preset model set includes: characteristic parameters of the initial model are extracted, and the characteristic parameters of the initial model are matched with characteristic parameters of each of the models in the model set to obtain a matching rate.

Specifically, regardless of the initial model corresponding to an entire target object, or the initial model corresponding to each part of a target object, in the process of matching the initial model with the models in the preset model set, as an implementation manner, the characteristic parameters of the initial model are extracted, and the extracted characteristic parameters are matched with characteristic parameters of each of the models in the model set; if a matching rate between the extracted characteristic parameters and characteristic parameters of one of the models in the model set exceeds a preset threshold, it may be indicated that the matching is successful; and correspondingly, if a matching rate between the extracted characteristic parameters and characteristic parameters of any of the models in the model set does not exceed the preset threshold, it may be indicated that the matching is failed. The characteristic parameters specifically may be parameters for characterizing at least one of a characteristic point of an outline or a critical point of a bone.

Figure 4:
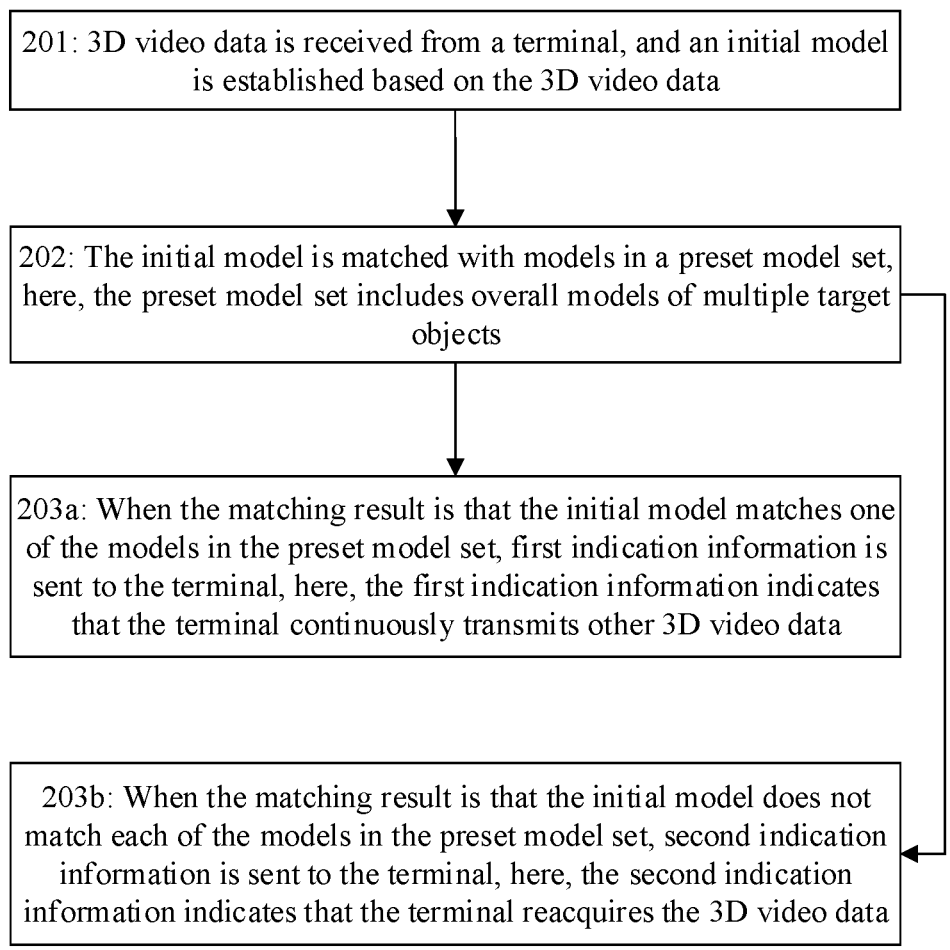
FIG. 4 is a third flowchart of a method for processing data according to an embodiment of the disclosure.

In an embodiment, as illustrated in FIG. 4, the method further includes the following operation.

At Block 203a: When the matching result is that the initial model matches one of the models in the preset model set, first indication information is sent to the terminal, here, the first indication information indicates that the terminal continuously transmits other 3D video data.

In the embodiment, if the MEC server determines that the initial model matches one of the models in the preset model set, i.e., the model corresponding to the 3D video data is established successfully, the first indication information is sent to the terminal, here, the first indication information indicates that the previous transmitted 3D video data can be modeled successfully, next 3D video data may be continuously transmitted.

In an implementation manner of the disclosure, when the matching result is that the initial model matches one of the models in the preset model set, a first model is generated based on the 3D video data and the matched model.

In the embodiment, when the matched result is that the initial model matches one of the models in the preset model set, it is indicated that an overall model of the corresponding target object has been stored in the server. However, the overall model is often not completely consistent with the target object corresponding to the 3D video data. In the embodiment, the matched model is adjusted and optimized based on the 3D video data (including the 2D video data and the depth data). It may be understood that only corresponding adjustments need to be made on the basis of the matched model to obtain the first model corresponding to the target object. Compared with a manner for generating a model with reference to the 3D video data, the time consumed for model establishment can be greatly shortened in the embodiment of the disclosure.

In an implementation manner of the disclosure, when the matching result is that the initial model matches one of the models in the preset model set, the method further includes: the matched model is updated based on the 3D video data. In the implementation manner, the matched model (i.e., an overall model corresponding to a target object) may be optimized. Specifically, the model is optimized based on the depth data and the 2D video data in the 3D video data. The optimization manner may be to adjust characteristic parameters, which do not match the characteristic parameters of the initial model, of the model according to the characteristic parameters of the initial model, so that the model is more accurate and closer to the target object.

In an embodiment, as illustrated in FIG. 4, the method further includes the following operation.

At Block 203b: when the matching result is that the initial model does not match any of the models in the preset model set, second indication information is sent to the terminal, here, the second indication information indicates that the terminal reacquires 3D video data.

In the embodiment, if the MEC server determines that the initial model does not match any of the models in the preset model set, it is indicated that the model corresponding to the 3D video data is not established successfully by the server, the second indication information is sent to the terminal, here, the second indication information indicates that the previous transmitted 3D video data cannot be modeled successfully, and corresponding 3D video data need to be retransmitted.

According to the technical solutions provided by the embodiments of the disclosure, by presetting, in the server, overall models of multiple target objects, on one hand, the server can perform a matching with preset models based on a frame of acquired 3D video data and can establish a model of a target object quickly based on the matched model, thus greatly shortening the time consumed for the modeling; on the other hand, since the models are preset in the server, the requirement on the technical support needed in a data transmission process is reduced, the rapid data transmission rate and the stable transmission may not be required, and the method is applied to various communication scenarios. And in addition, since the models are preset in the server, it is unnecessary to transmit all 3D video data acquired by a terminal for modeling, and thus the volume of the data to be transmitted is also reduced to a certain extent.

Figure 5:
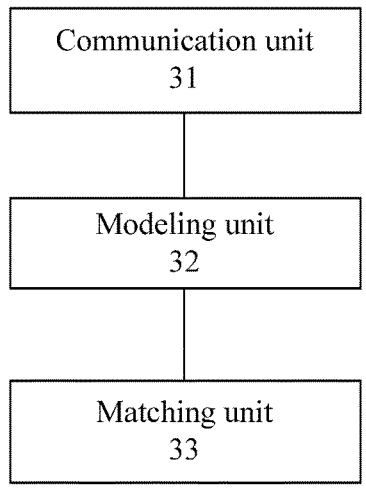
FIG. 5 is a diagram of a component structure of a server according to an embodiment of the disclosure.

In order to implement the method at a server side in the embodiments of the disclosure, the embodiments of the disclosure further provide an MEC server. FIG. 5 is a diagram of a component structure of a server in an embodiment of the disclosure. As illustrated in FIG. 5, the server includes: a communication unit 31, a modeling unit 32 and a matching unit 33.

The communication unit 31 is configured to receive 3D video data from a terminal.

The modeling unit 32 is configured to establish an initial model based on the 3D video data received by the communication unit 31.

The matching unit 33 is configured to match the initial model with models in a preset model set, here, the preset model set includes overall models of multiple target objects.

The communication unit 31 is further configured to send indication information to the terminal based on a matching result acquired by the matching unit 33.

Figure 6:
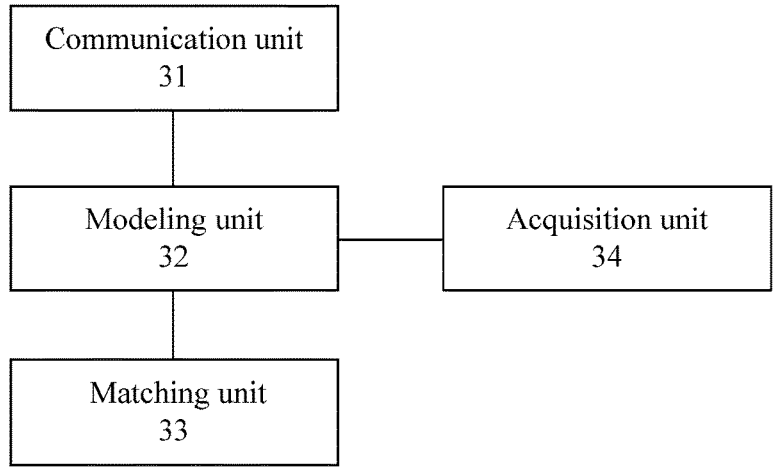
FIG. 6 is a diagram of another component structure of a server according to an embodiment of the disclosure.

In an embodiment, as illustrated in FIG. 6, the server further includes an acquisition unit 34, configured to acquire multiple pieces of sample data, here, the multiple pieces of sample data include at least one of global data corresponding to each target object or local data corresponding to different parts of each target object.

The modeling unit 32 is further configured to establish an overall model of the target object based on the multiple pieces of sample data; or establish local models of different parts of the target object based on the multiple pieces of sample data, and generate an overall model of the target object based on the local models of different parts of the target object.

As an implementation manner, the communication unit 31 is configured to send, when the matching result is that the initial model matches one of the models in the preset model set, first indication information to the terminal, here, the first indication information indicates that the terminal continuously transmits other 3D video data. In an embodiment, the modeling unit 32 is further configured to update, when the matching result is that the initial model matches the one of the models in the preset model set, the matched model based on the 3D video data.

As an implementation manner, the communication unit 31 is configured to send, when the matching result is that the initial model does not match each of the models in the preset model set, second indication information to the terminal, here, the second indication information indicates that the terminal reacquires 3D video data.

In the embodiment of the disclosure, the modeling unit 32, the matching unit 33 and the acquisition unit 34 in the server may be implemented by a processor in the terminal in actual application, such as a Central Processing Unit (CPU), a Digital Signal Processor (DSP), a Microcontroller Unit (MCU) or a Field-Programmable Gate Array (FPGA). The communication unit 31 in the server may be implemented by a communication module (including: a basic communication suite, an operation system, a communication module, a standard interface and a protocol, etc.) and a transceiver antenna.

In the embodiment, when the server performs data processing, the division of the above program modules is merely for an example. In actual application, the above processing may be performed by different program modules as required. That is, the internal structure of the server is divided into different program modules to finish all or a part of the above processing. In addition, the server provided by the above embodiment and the embodiments of the method for processing data pertain to the same concept, and the specific implementation process is detailed in the method embodiment and will not be repeated.

Figure 7:
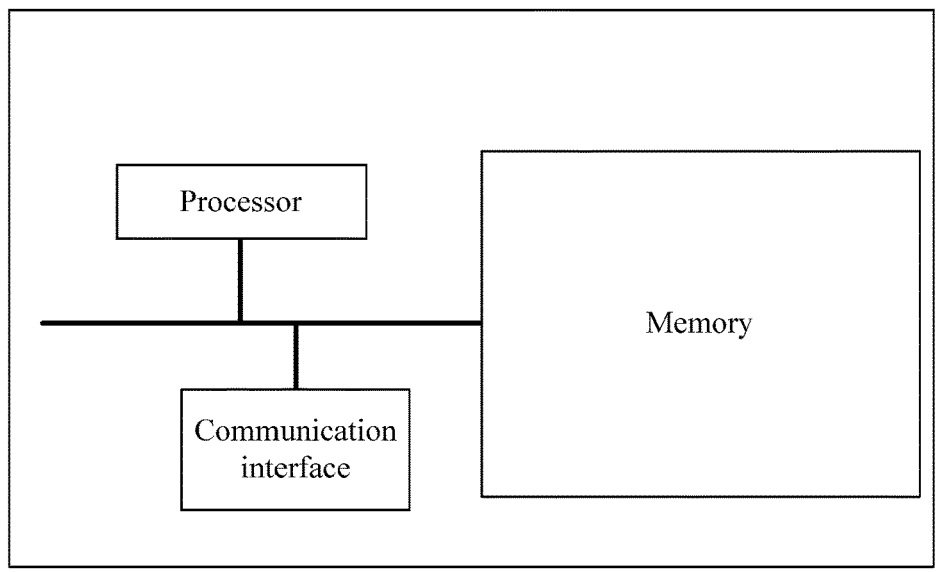
FIG. 7 is a diagram of a hardware component structure of a server according to an embodiment of the disclosure.

Based on the hardware implementation of the device, the embodiments of the disclosure further provide a server. FIG. 7 is a diagram of a hardware component structure of a server in an embodiment of the disclosure. As illustrated in FIG. 7, the server includes a memory, a processor, and a computer program stored in the memory and capable of running on the processor. The processor executes the computer program to: receive 3D video data from a terminal, and establish an initial model based on the 3D video data; match the initial model with models in a preset model set, here, the preset model set includes overall models of multiple target objects; and send indication information to the terminal based on a matching result.

In an embodiment, the processor executes the computer program to: acquire multiple pieces of sample data, here, the multiple pieces of sample data include at least one of global data corresponding to each target object or local data corresponding to different parts of each target object; establish an overall model of the target object based on the multiple pieces of sample data, or establish local models of different parts of the target object based on the multiple pieces of sample data and generate an overall model of the target object based on the local models of different parts of the target object.

In an embodiment, the processor executes the program to: send, when the matching result is that the initial model matches one of the models in the preset model set, first indication information to the terminal, here, the first indication information indicates that the terminal continuously transmits other 3D video data.

In an embodiment, the processor executes the program to: update, when the matching result is that the initial model matches the one of the models in the preset model set, the matched model based on the 3D video data.

In an embodiment, the processor executes the program to: send, when the matching result is that the initial model does not match each of the models in the preset model set, second indication information to the terminal, here, the second indication information indicates that the terminal reacquires the 3D video data. The server further includes a communication interface. Various components in the server are coupled together via a bus system. The bus system is configured to implement connection and communication among various components. In addition to a data bus, the bus system further includes a power bus, a control bus and a state signal bus.

The memory in the embodiment may be a volatile memory or a nonvolatile memory, and may also include both the volatile memory and the nonvolatile memory. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optic disc, or a Compact Disc Read-Only Memory (CD-ROM); and the magnetic surface memory may be a magnetic disk memory or a magnetic tape memory. The volatile memory may be Random Access Memory (RAM), which is used as an external high-speed cache. Through exemplary but not restrictive description, many forms of RAMs may be available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory described in the embodiment of the disclosure is intended to include, but not limited to, these memories and any other suitable types of memories.

The method described in the embodiments of the disclosure may be applied to a processor, or is implemented by the processor. The processor may be an integrated circuit chip and has a signal processing capability. In an implementation process, each operation of the method may be implemented by a hardware integrated logic circuit in the processor or an instruction in a software form. The processor may be a universal processor, a DSP, or other programmable logic device, discrete gate or transistor logic device, discrete hardware component, etc. The processor may implement or execute each method, operation and logical block diagram in the embodiments of the disclosure. The universal processor may be a microprocessor or any conventional processor, etc. The operations of the method in the embodiments of the disclosure may be directly embodied as being implemented by a hardware decoding processor, or implemented by a combination of hardware and software modules in the decoding processor. The software modules may be located in a storage medium. The storage medium is located in a memory. The processor reads information in the memory and implements the operations of the method in combination with the hardware modules.

The embodiments of the disclosure further provide a chip, which includes a processor. The processor may invoke a computer program from a memory and run the computer program to implement the method in the embodiments of the disclosure.

In some embodiments, the chip may further include a memory. The processor may invoke the computer program from the memory and run the computer program to implement the method in the embodiments of the disclosure.

The memory is a separate device independent of the processor, and may also be integrated to the processor.

In some embodiments, the chip may further include an input interface. The processor may control the input interface to communicate with other devices or chips, and specifically may acquire information or data sent by the other devices or chips.

In some embodiments, the chip may further include an output interface. The processor may control the output interface to communicate with other devices or chips, and specifically may output information or data to the other devices or chips.

In some embodiments, the chip may be applied to the MEC server in the embodiments of the disclosure. Moreover, the chip may implement corresponding flows implemented by the MEC server in each method in the embodiments of the disclosure, which will not be repeated for the briefness.

The chip in the embodiments of the disclosure may further be referred to as a system-level chip, a system chip, a chip system or a system-on-chip, etc.

The embodiments of the disclosure further provide a computer storage medium, which is specifically a computer readable storage medium. The computer storage medium stores a computer instruction that, when executed by a processor, implements the method for processing the data which is applied to an MEC server in the embodiments of the disclosure.

The embodiments of the disclosure further provide a computer program product, which includes a computer program instruction.

In some embodiments, the computer program product may be applied to the MEC server in the embodiments of the disclosure. Moreover, the computer program instruction causes a computer to execute corresponding flows implemented by the MEC server in each method in the embodiments of the disclosure, which will not be repeated for the briefness.

The embodiments of the disclosure further provide a computer program.

In some embodiments, the computer program may be applied to the MEC server in the embodiments of the disclosure. When the computer program is run on a computer, the computer executes corresponding flows implemented by the MEC server in each method in the embodiments of the disclosure, which will not be repeated for the briefness.

Additional Embodiments

At least some embodiments of the disclosure provide a method for processing data, A method for processing data, the method being applied to a Mobile Edge Computing (MEC) server and comprising:

receiving Three-Dimensional (3D) video data from a terminal, and establishing an initial model based on the 3D video data;

matching the initial model with models in a preset model set, the preset model set comprising overall models of a plurality of target objects; and sending indication information to the terminal based on a matching result.

According to at least some embodiment, the method further comprising: establishing the overall models in the preset model set.

According to at least some embodiment, establishing the overall models in the preset model set comprises:

acquiring a plurality of pieces of sample data, the plurality of pieces of sample data comprising at least one of global data corresponding to each target object or local data corresponding to different parts of each target object; and responsive to that the plurality of pieces of sample data comprise global data corresponding to each target object, establishing an overall model of the target object based on the plurality of pieces of sample data; responsive to that the plurality of pieces of sample data comprise local data corresponding to different parts of each target object, establishing local models of different parts of the target object based on the plurality of pieces of sample data, and generating an overall model of the target object based on the local models of different parts of the target object.

According to at least some embodiment, the 3D video data comprises 2D video data and depth data, or comprises depth data, and establishing the initial model based on the 3D video data comprises:

performing a modeling based on the depth data in the 3D video data to obtain the initial model.

According to at least some embodiment, matching the initial model with the models in the preset model set comprises:

extracting characteristic parameters of the initial model;

matching the characteristic parameters of the initial model with characteristic parameters of each of the models in the preset model set to obtain a matching rate;

responsive to that the matching rate between the characteristic parameters of the initial model and the characteristic parameters of one of the models in the preset model set exceeds a preset threshold, indicating that a matching is successful; and responsive to that the matching rate between the characteristic parameters of the initial model and characteristic parameters of each of the models in the preset model set does not exceed the preset threshold, indicating that a matching is failed.

According to at least some embodiment, sending the indication information to the terminal based on the matching result comprises:

responsive to that the matching result is that the initial model matches one of the models in the preset model set, sending first indication information to the terminal, wherein the first indication information indicates that the terminal continuously transmits next 3D video data.

According to at least some embodiment, sending the indication information to the terminal based on the matching result comprises:

responsive to that the matching result is that the initial model does not match each of the models in the preset model set, sending second indication information to the terminal, wherein the second indication information indicates that the terminal reacquires 3D video data.

According to at least some embodiment, the method further comprising:

responsive to that the matching result is that the initial model matches the one of the models in the preset model set, updating the matched model based on the 3D video data.

At least some embodiments of the disclosure provide a Mobile Edge Computing (MEC) server, comprising a transceiver and a processor, wherein the transceiver is configured to receive 3D video data from a terminal; and the processor is configured to establish an initial model based on the 3D video data; and match the initial model with models in a preset model set, the preset model set comprising overall models of a plurality of target objects; and the transceiver is configured to send indication information to the terminal based on a matching result.

According to at least some embodiment, the processor is configured to establish the overall models in the preset model set.

According to at least some embodiment, the processor is configured to:

acquire a plurality of pieces of sample data, the plurality of pieces of sample data comprising at least one of global data corresponding to each target object or local data corresponding to different parts of each target object; and responsive to that the plurality of pieces of sample data comprise global data corresponding to each target object, establish an overall model of the target object based on the plurality of pieces of sample data; responsive to that the plurality of pieces of sample data comprise local data corresponding to different parts of each target object, establish local models of different parts of the target object based on the plurality of pieces of sample data, and generate an overall model of the target object based on the local models of different parts of the target object.

According to at least some embodiment, the 3D video data comprises 2D video data and depth data, or comprises depth data.

According to at least some embodiment, the processor is configured to perform a modeling based on the depth data in the 3D video data to obtain the initial model.

According to at least some embodiment, the processor is configured to:

extract characteristic parameters of the initial model;

match the characteristic parameters of the initial model with characteristic parameters of each of the models in the preset model set to obtain a matching rate;

responsive to that the matching rate between the characteristic parameters of the initial model and the characteristic parameters of one of the models in the preset model set exceeds a preset threshold, indicate that a matching is successful; and responsive to that the matching rate between the characteristic parameters of the initial model and characteristic parameters of each of the models in the preset model set does not exceed the preset threshold, indicate that a matching is failed.

According to at least some embodiment, the transceiver is configured to send, responsive to that the matching result is that the initial model matches one of the models in the preset model set, first indication information to the terminal, wherein the first indication information indicates that the terminal continuously transmits next 3D video data.

According to at least some embodiment, the transceiver is configured to send, responsive to that the matching result is that the initial model does not match each of the models in the preset model set, second indication information to the terminal, wherein the second indication information indicates that the terminal reacquires 3D video data.

According to at least some embodiment, the processor is further configured to update, responsive to that the matching result is that the initial model matches the one of the models in the preset model set, the matched model based on the 3D video data.

At least some embodiments of the disclosure provide a Mobile Edge Computing (MEC) server, comprising a communication unit, a modeling unit and a matching unit, wherein the communication unit is configured to receive 3D video data from a terminal; the modeling unit is configured to establish an initial model based on the 3D video data received by the communication unit; the matching unit is configured to match the initial model with models in a preset model set, the preset model set comprising overall models of a plurality of target objects; and the communication unit is further configured to send indication information to the terminal based on a matching result obtained by the matching unit.

According to at least some embodiment, the modeling unit is configured to establish the overall models in the preset model set.

According to at least some embodiment, further comprising an acquisition unit, wherein the acquisition unit is configured to acquire a plurality of pieces of sample data, the plurality of pieces of sample data comprising at least one of global data corresponding to each target object or local data corresponding to different parts of each target object; and the modeling unit is further configured to: responsive to that the plurality of pieces of sample data comprise global data corresponding to each target object, establish an overall model of the target object based on the plurality of pieces of sample data; responsive to that the plurality of pieces of sample data comprise local data corresponding to different parts of each target object, establish local models of different parts of the target object based on the plurality of pieces of sample data, and generate an overall model of the target object based on the local models of different parts of the target object.

According to at least some embodiment, the 3D video data comprises 2D video data and depth data, or comprises depth data.

According to at least some embodiment, the modeling unit is configured to perform a modeling based on the depth data in the 3D video data to obtain the initial model.

According to at least some embodiment, the matching unit is configured to: extract characteristic parameters of the initial model; match the characteristic parameters of the initial model with characteristic parameters of each of the models in the preset model set to obtain a matching rate; responsive to that the matching rate between the characteristic parameters of the initial model and the characteristic parameters of one of the models in the preset model set exceeds a preset threshold, indicate that a matching is successful; responsive to that the matching rate between the characteristic parameters of the initial model and characteristic parameters of each of the models in the preset model set does not exceed the preset threshold, indicate that a matching is failed.

According to at least some embodiment, the communication unit is configured to send, responsive to that the matching result is that the initial model matches one of the models in the preset model set, first indication information to the terminal, wherein the first indication information indicates the terminal continuously transmits next 3D video data.

According to at least some embodiment, the communication unit is configured to send, responsive to that the matching result is that the initial model does not match each of the models in the preset model set, second indication information to the terminal, wherein the second indication information indicates that the terminal reacquires 3D video data.

According to at least some embodiment, wherein the modeling unit is further configured to update, responsive to that the matching result is that the initial model matches the one of the models in the preset model set, the matched model based on the 3D video data.

At least some embodiments of the disclosure provide a non-transitory computer-readable storage medium having stored thereon a computer instruction that, when executed by a processor of a Mobile Edge Computing (MEC) server, causes the processor to the method for processing data in the above additional embodiments.

The embodiments of the disclosure provide a method for processing data, a server and a computer storage medium. The method includes: 3D video data is received from a terminal, and an initial model is established based on the 3D video data; the initial model is matched with models in a preset model set, here, the preset model set includes overall models of multiple target objects; and indication information is sent to the terminal based on a matching result. According to the technical solutions provided by the embodiments of the disclosure, the overall models of the multiple target objects are preset in a server, on one hand, the server can perform a matching with preset models based on the acquired a frame of 3D video data and can establish quickly a model of a target object based on the matched model, thus greatly shortening the time consumed for the modeling; on the other hand, since the models are preset in the server, the requirement on the technical support needed in a data transmission process is reduced, the rapid data transmission rate and the stable transmission environment may not be required, and it is suitable to various communication scenarios. In addition, since the models are preset in the server, it is also possible to perform modeling without transmitting all 3D video data acquired by a terminal, and thus the volume of data to be transmitted is also reduced to a certain extent.

In the several embodiments provided in the disclosure, the disclosed methods and servers may be implemented in other manners. The devices described in the above embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections of the components may be indirect couplings or communication connections, through some interfaces, of the devices or units, and may be electrical, mechanical or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, each functional unit in the embodiments of the disclosure may be integrated to a second processing unit, each unit may also be served as one unit independently, or two or more than two units may also be integrated to one unit. The integrated unit may be implemented by using a hardware form, and may also be implemented by using a form of hardware and software functional units.

Those of ordinary skill in the art may understand that all or a part of operations for implementing the above method embodiments may be performed by program instruction relevant hardware. The program may be stored in a computer readable storage medium. The program, when being executed, performs the operations of the method embodiments. The storage medium includes: various media capable of storing a program code, such as a mobile storage device, an ROM, an RAM, a magnetic disk or an optical disc.

When being implemented in the form of a software functional unit and sold or used as an independent product, the integrated unit may be stored in a computer-readable storage medium. Based on such an understanding, the technical solutions of the disclosure essentially, or the part contributing to the prior art, or some of the technical solutions may be implemented in a form of a software product. The computer software product is stored in a storage medium and includes several instructions to cause a computer device (which may be a personal computer, a server, or a network device) to perform all or some of the operations of the methods described in the embodiments of the disclosure. The foregoing storage medium includes any medium that can store a program code, such as a mobile storage device, an ROM, an RAM, a magnetic disk, or an optical disc.

The technical solutions in the embodiments of the disclosure may be combined arbitrarily without conflict.

The foregoing descriptions are merely specific implementation manners of the disclosure, but are not intended to limit the scope of protection of the disclosure. Any variation or replacement that can be readily conceived by a person skilled in the art within the technical scope disclosed in the disclosure shall fall within the scope of protection of the disclosure.

The invention claimed is:

1. A method for processing data, the method being applied to a Mobile Edge Computing (MEC) server and comprising:
  establishing overall models of a plurality of target objects in a preset model set, comprising:
    acquiring a plurality of pieces of sample data, the plurality of pieces of sample data comprising at least one of global data corresponding to each target object or local data corresponding to different parts of each target object; and
    responsive to that the plurality of pieces of sample data comprise global data corresponding to each target object, establishing an overall model of the target object based on the plurality of pieces of sample data; responsive to that the plurality of pieces of sample data comprise local data corresponding to different parts of each target object, establishing local models of different parts of the target object based on the plurality of pieces of sample data, and generating an overall model of the target object based on the local models of different parts of the target object;
  receiving Three-Dimensional (3D) video data from a terminal, and establishing an initial model based on the 3D video data;
  matching the initial model with the overall models in the preset model set; and
  sending indication information to the terminal based on a matching result.

2. The method of claim 1, wherein the 3D video data comprises 2D video data and depth data, or comprises depth data, and
  establishing the initial model based on the 3D video data comprises:
  performing a modeling based on the depth data in the 3D video data to obtain the initial model.

3. The method of claim 1, wherein matching the initial model with the models in the preset model set comprises:
  extracting characteristic parameters of the initial model;
  matching the characteristic parameters of the initial model with characteristic parameters of each of the models in the preset model set to obtain a matching rate;
  responsive to that the matching rate between the characteristic parameters of the initial model and the characteristic parameters of one of the models in the preset model set exceeds a preset threshold, indicating that a matching is successful; and
  responsive to that the matching rate between the characteristic parameters of the initial model and characteristic parameters of each of the models in the preset model set does not exceed the preset threshold, indicating that a matching is failed.

4. The method of claim 1, wherein sending the indication information to the terminal based on the matching result comprises:
  responsive to that the matching result is that the initial model matches one of the models in the preset model set, sending first indication information to the terminal, wherein the first indication information indicates that the terminal continuously transmits next 3D video data.

5. The method of claim 1, wherein sending the indication information to the terminal based on the matching result comprises:

responsive to that the matching result is that the initial model does not match each of the models in the preset model set, sending second indication information to the terminal, wherein the second indication information indicates that the terminal reacquires 3D video data.

6. The method of claim 4, further comprising:
responsive to that the matching result is that the initial model matches the one of the models in the preset model set, updating a matched model based on the 3D video data.

7. A Mobile Edge Computing (MEC) server, comprising a transceiver; and
a processor,
wherein the transceiver is configured to receive Three-Dimensional (3D) video data from a terminal; and
the processor is configured to establish overall models of a plurality of target objects in a preset model set, which comprises:
  acquiring a plurality of pieces of sample data, the plurality of pieces of sample data comprising at least one of global data corresponding to each target object or local data corresponding to different parts of each target object; and
  responsive to that the plurality of pieces of sample data comprise global data corresponding to each target object, establishing an overall model of the target object based on the plurality of pieces of sample data; responsive to that the plurality of pieces of sample data comprise local data corresponding to different parts of each target object, establishing local models of different parts of the target object based on the plurality of pieces of sample data, and generating an overall model of the target object based on the local models of different parts of the target object;
the processor is further configured to establish an initial model based on the 3D video data; and match the initial model with the overall models in the preset model set; and
the transceiver is configured to send indication information to the terminal based on a matching result.

8. The MEC server of claim 7, wherein the 3D video data comprises 2D video data and depth data, or comprises depth data.

9. The MEC server of claim 8, wherein the processor is configured to perform a modeling based on the depth data in the 3D video data to obtain the initial model.

10. The MEC server of claim 7, wherein the processor is configured to:
extract characteristic parameters of the initial model;
match the characteristic parameters of the initial model with characteristic parameters of each of the models in the preset model set to obtain a matching rate;
responsive to that the matching rate between the characteristic parameters of the initial model and the characteristic parameters of one of the models in the preset model set exceeds a preset threshold, indicate that a matching is successful; and
responsive to that the matching rate between the characteristic parameters of the initial model and characteristic parameters of each of the models in the preset model set does not exceed the preset threshold, indicate that a matching is failed.

11. The MEC server of claim 7, wherein the transceiver is configured to send, responsive to that the matching result is that the initial model matches one of the models in the preset model set, first indication information to the terminal, wherein the first indication information indicates that the terminal continuously transmits next 3D video data.

12. The MEC server of claim 7, wherein the transceiver is configured to send, responsive to that the matching result is that the initial model does not match each of the models in the preset model set, second indication information to the terminal, wherein the second indication information indicates that the terminal reacquires 3D video data.

13. The MEC server of claim 11, wherein the processor is further configured to update, responsive to that the matching result is that the initial model matches the one of the models in the preset model set, a matched model based on the 3D video data.

14. A non-transitory computer-readable storage medium having stored thereon a computer instruction that, when executed by a processor of a Mobile Edge Computing (MEC) server, causes the processor to perform a method for processing data, the method comprising:
establishing overall models of a plurality of target objects in a preset model set, comprising:
  acquiring a plurality of pieces of sample data, the plurality of pieces of sample data comprising at least one of global data corresponding to each target object or local data corresponding to different parts of each target object; and
  responsive to that the plurality of pieces of sample data comprise global data corresponding to each target object, establishing an overall model of the target object based on the plurality of pieces of sample data; responsive to that the plurality of pieces of sample data comprise local data corresponding to different parts of each target object, establishing local models of different parts of the target object based on the plurality of pieces of sample data, and generating an overall model of the target object based on the local models of different parts of the target object;
receiving Three-Dimensional (3D) video data from a terminal, and
establishing an initial model based on the 3D video data;
matching the initial model with the overall models in a preset model set; and
sending indication information to the terminal based on a matching result.

* * * * *